April 30, 1968 G. M. J. B. THYSSENS 3,381,096

SIGNALLING AND DETECTING SYSTEMS

Filed Sept. 8, 1964 6 Sheets-Sheet 1

April 30, 1968 G. M. J. B. THYSSENS 3,381,096

SIGNALLING AND DETECTING SYSTEMS

Filed Sept. 8, 1964 6 Sheets-Sheet 4

3,381,096
Patented Apr. 30, 1968

3,381,096

SIGNALLING AND DETECTING SYSTEMS

Guido Maria Josepha Benedikt Thyssens, Ekeren, Belgium, assignor to International Standard Electric Corporation, New York, N.Y., a corporation of Delaware Filed Sept. 8, 1964, Ser. No. 394,984
9 Claims. (Cl. 179—84)

ABSTRACT OF THE DISCLOSURE

A compelled multi-frequency signalling system wherein the receiver comprises a plurality of narrow band frequency receivers and a broad band frequency receiver. A code verifying bistable device is operated when one of a number of predetermined combination of the narrow band receivers is operated. The bistable device is maintained operated as long as the broad band receiver is actuated.

The present invention relates to a multiple frequency signalling system including multiple-frequency generator means associated with multiple-frequency receiver means over a transmission path. The receiver means include one or more associations of a plurality of narrow band frequency receivers, each adapted to react to a predetermined frequency with a broad band frequency receiver adapted to react to the signalling frequencies of the associated narrow band frequency receivers.

Such a multiple-frequency signalling system is disclosed in the introductive part of the U.S. Patent 3,072,747. This known system does however not ensure protection against errors which are due to openings in the transmission path, which has for instance been established between a first and a second register circuits. Indeed, such a transmission path is established through contacts of selection rotary switches so that the hunting of other selection rotary switches mounted on the same shafts as the first mentioned switches may cause these shafts to vibrate and therefore to open momentarily the above contacts and hence the above transmission path. In a signalling system, operating according to the compelled method for instance, the exchange of signals always starts with the transmission of a forward signal which has no definite length but which continues until a backward signal is received that is transmitted on receipt and in acknowledgment of the forward signal. In turn, the transmission of the backward acknowledgment signal is continued until the end of the forward signal is recognized. The next forward signal may be transmitted from the moment the end of this backward signal is recognized. If the above transmission path is interrupted at the moment the second register circuit starts the transmission of a backward signal in acknowledgment of a first forward signal received from the first register circuit, the operated narrow band frequency-code receivers in the second register circuit release. This effect is interpreted by the second register circuit as a normal end of a signal and therefore it prepares itself for the receipt of the second frequency-code signal.

The first register circuit will however continue the transmission of the first frequency code signal due to the fact that it has not received the backward signal. Therefore, when the line connection is restored, this first frequency-code signal will be interpreted by the second register circuit as a second frequency-code signal and will be registered a second time. This is naturally a faulty operation.

It is therefore an object of the present invention to provide a multiple-frequency signalling system of the above type but which does not present this drawback.

The present multiple-frequency signalling system is characterized by the fact, that said receiver means include a code-verifying bistate device normally in a first condition, set to a second condition upon one out of a number of predetermined combinations of narrow band frequency receivers being operated, but maintained in said second condition under the control of the associated broad band frequency receiver.

The present invention relates also to a level detector circuit comprising an amplifying device, e.g. transistor, which has at least a first, a second and a third electrode, said first electrode, e.g. base, being connected on the one hand to one plate of an input capacitor, the other plate of which constitutes an input terminal of said level detector circuit and on the other hand to a first fixed DC potential through a first resistance, said second electrode, e.g. emitter, being connected to a second fixed DC potential through a second resistance and said third electrode, e.g. collector, which is an output electrode being connected to a third fixed DC potential through a third resistance. The present level detector circuit is characterized by the fact that said second electrode is also coupled to said third fixed DC potential and that said second resistance is split into a first and a second part, the junction of which is connected to said first electrode via a diode which is conductive for the rest condition of said amplifying device.

The above mentioned and other objects and features of the invention will become more apparent and the invention itself will be best understood by referring to the following description of embodiments taken in conjunction with the accompanying drawings in which.

Figures 1, 2:
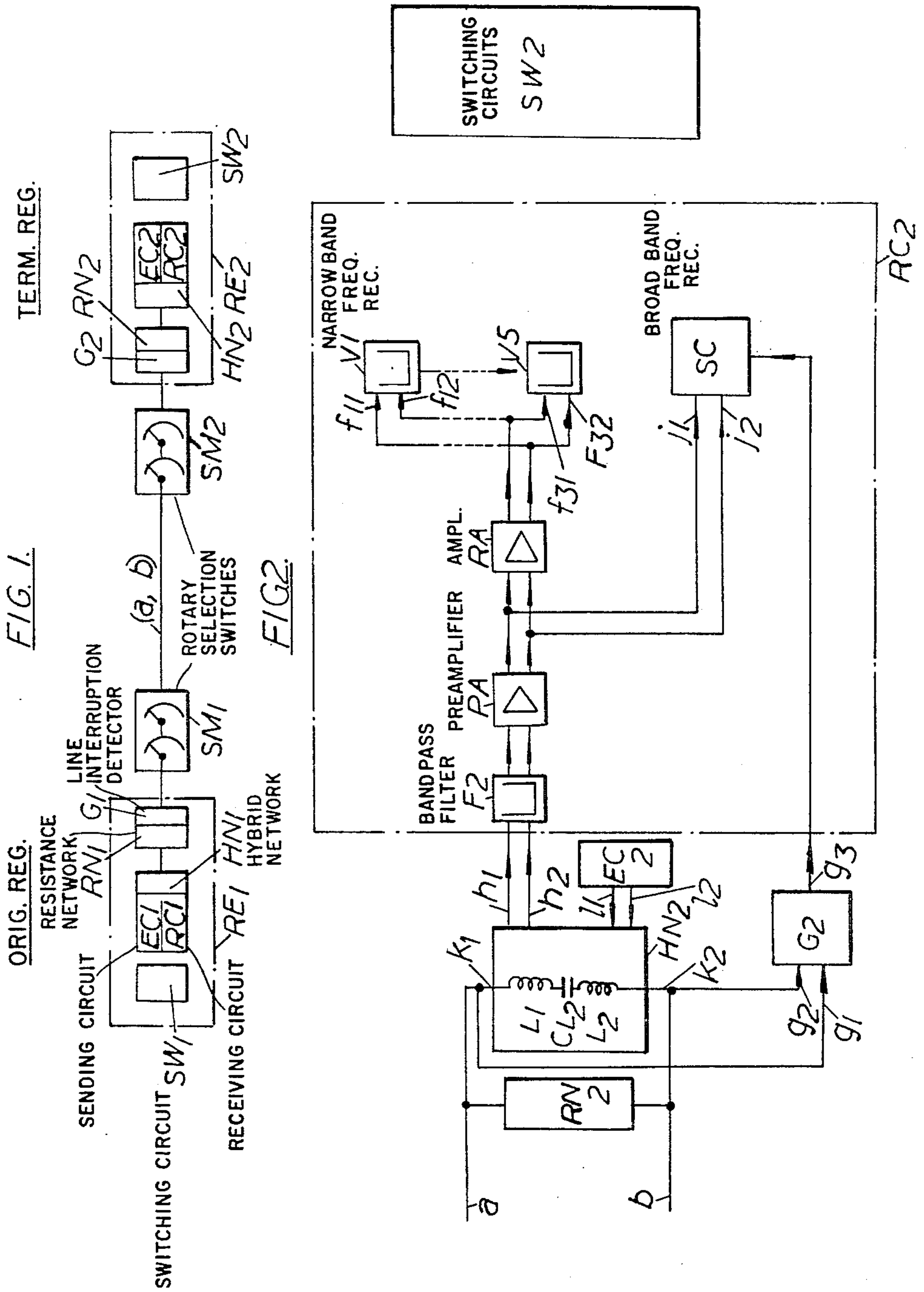
FIG. 1 shows an established transmission path between an originating register circuit and a terminating register circuit.
FIG. 2 represents the terminating register circuit.

Principally referring to FIG. 1 there is shown a line connection established between an originating register RE1 and a terminating register RE2 via the wires *a*, *b* of the line and through the selection rotary switches SM1 and SM2. The register circuit RE1 includes the hybrid network HN1, the sending circuit EC1, the receiving circuit RC1, the resistance network RN1, the line interruption detector G1 and the switching circuits SW1. The register circuit RE2 includes the hybrid network HN2, the sending circuit EC2, the receiving circuit RC2, the resistance network RN2, the line interruption detector G2, and the switching circuits SW2.

Principally referring to FIG. 2 there is shown a part of the hybrid network HN2 which is of a well known type, the receiving and sending circuits RC2 and EC2 and the switching circuits SW2. The shown part of the hybrid network HN2 is constituted by the series connection of the winding L1, the capacitor CL2 and the winding L2 identical to $L_1$. The inputs *k*1, *k*2 of this hybrid network HN2 are connected to the inputs *g*1, *g*2 of the line interruption detector G2, whereas the inputs *l*1, *l*2 of this hybrid network are connected to the sending circuit EC2. The outputs *h*1, *h*2 of the hybrid network HN2 are connected to the inputs of a bandpass filter F2 the outputs of which are connected to the inputs of a preamplifier PA. The outputs of this preamplifier PA are connected on the one hand, to the inputs of an amplifier RA the outputs of which are connected to the inputs *f*11, 12 to *f*51, 52 of the narrow-band frequency-receivers V1 to V5 and, on the other hand, to the inputs *j*1, *j*2 of the broad band frequency receiver SC.

Figure 3:
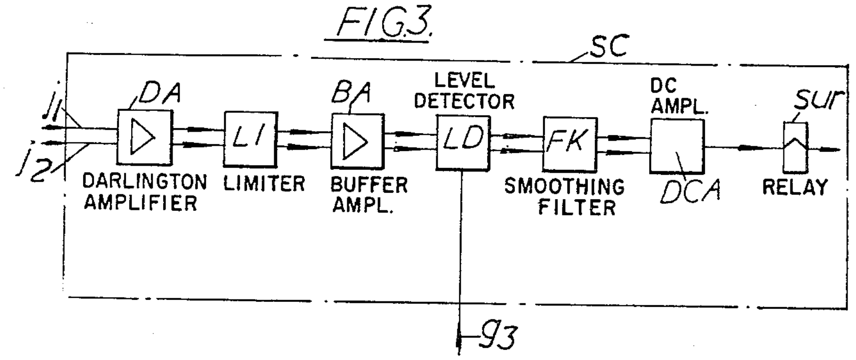
FIG. 3 is a block diagram of a broad band frequency receiver according to the invention.

Referring to FIG. 3 this broad band frequency receiver SC is constituted by the series connection of an amplifier DA of the Darlington type, a limiter circuit LI, a buffer amplifier BA, a level detector LD, a smoothing filter circuit FK and a DC current amplifier DCA the single output of which, is connected to a battery through the winding of the relay S*ur*.

Figure 4:
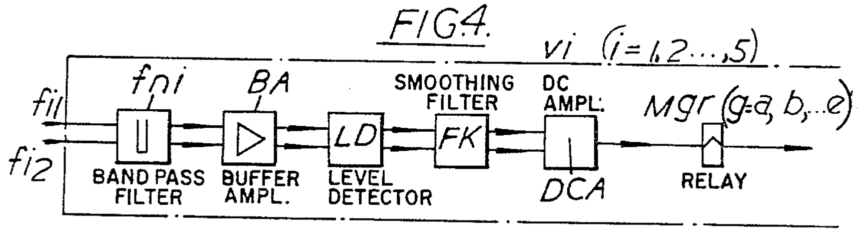
FIG. 4 represents a diagram of a narrow band frequency receiver.

Referring to FIG. 4 each narrow band frequency receiver V1 to V5 is constituted by the series connection of a narrow-bandpass filter F*ni* (*i*=1 to 5 respectively), a buffer amplifier BA, a level detector circuit LD, a smoothing filter circuit FK and a DC current amplifier DCA the single output of which is connected to a battery through a relay M*ar* to M*er* respectively. The circuits BA, LD, FK and DCA are of the same type as those indicated by the same references in FIG. 3.

The switching circuits SW1 included in the originating register circuit RE1 are substantially identical to those shown and described in the Belgian Patent 600,919 (H. Verhille 2–1). Therefore FIG. 5 only shows the part of these switching circuits SW1 which is different from those shown in this Belgian patent. In the present switching circuits SW1 the holding winding of the relay K'*r* is connected to ground via its own make contact $k'_1$, and the make contact *su'* of the above relay S'*ur* of a broad band frequency receiver SC' included in the originating register RE1 whereas the operating winding of the relay K'*r* is connected to ground through the make contact *su'*.

Figure 6:
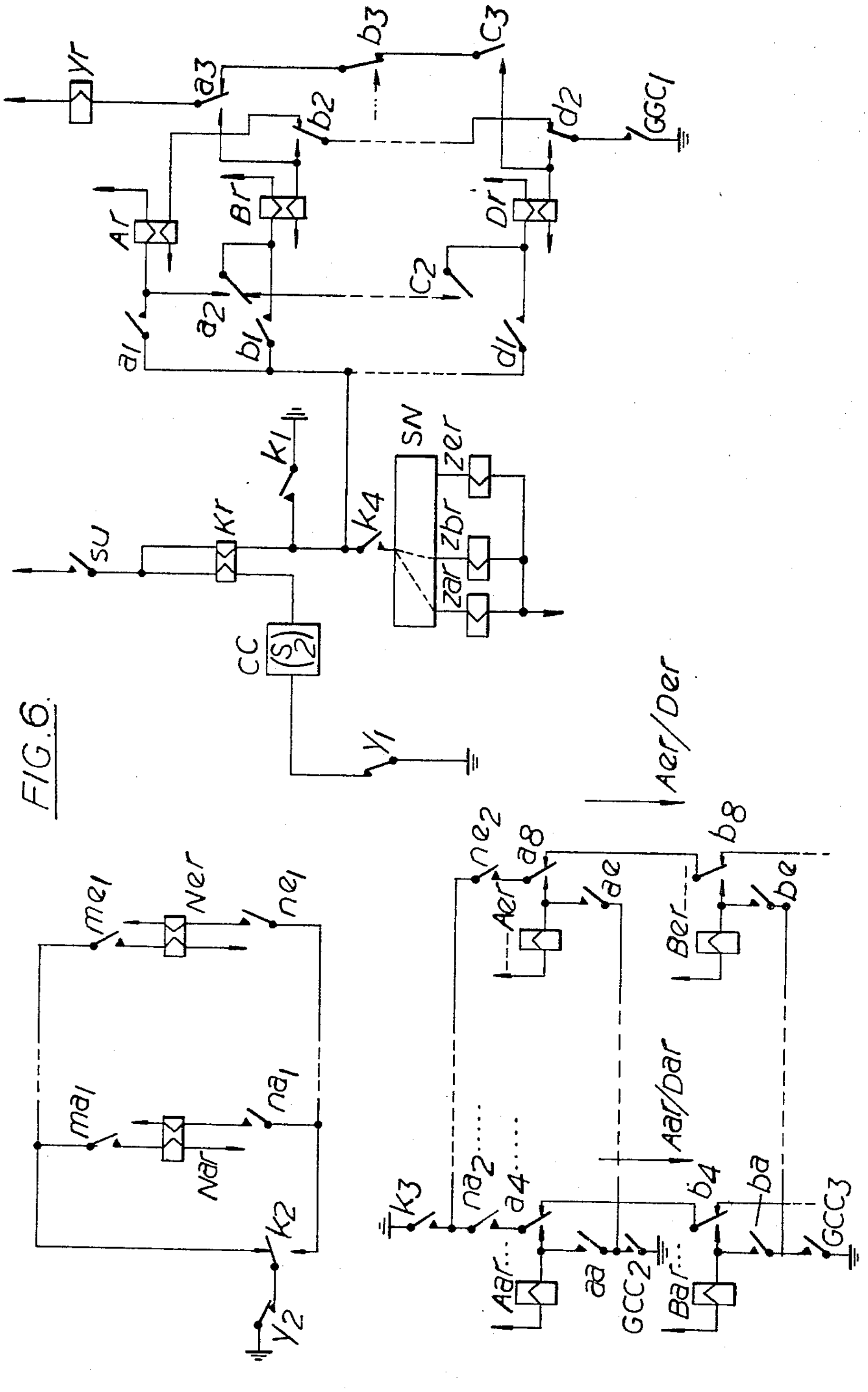
FIG. 6 represents switching circuits included in the terminating register circuit.

Referring to FIG. 6 there are shown the switching circuits SW2 included in the terminating register circuit RE2 which are somewhat different from the switching circuits SW1 and which will be described when describing the operation of the system.

Figure 7:
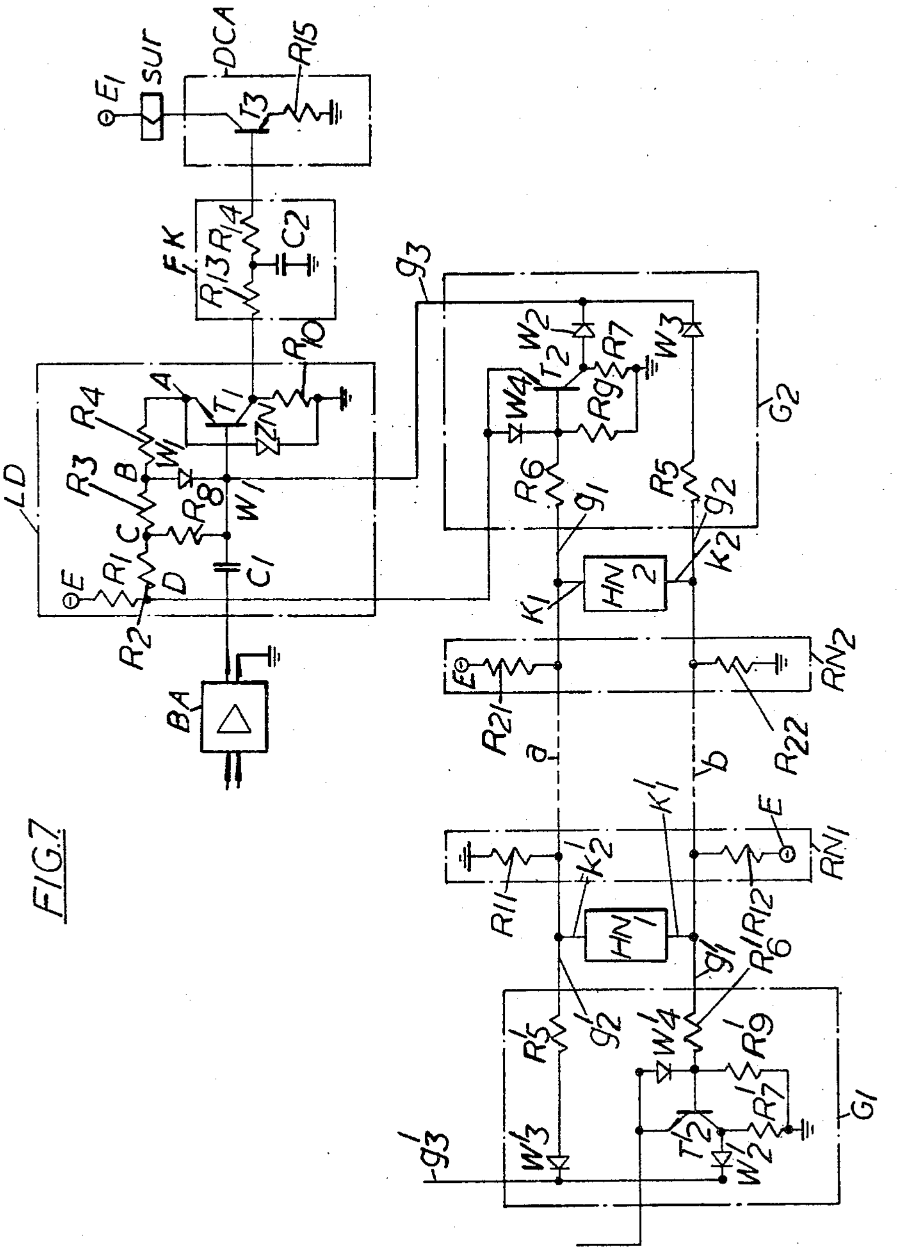
FIG. 7 shows in detail a part of the circuits, according to a first embodiment, represented in FIGS. 1, 2 and 3.

Referring to FIG. 7 the circuits RN1, G1 and RN2, G2 forming part of the originating and terminating register circuits RE1 and RE2 respectively, are shown in detail, as well as the circuits LD, FK, DCA forming part of the broad band frequency receiver SC, which is associated to the narrow band frequency receivers V1 to V5 (FIG. 2) of the terminating register circuit RE2. It should be noted that a similar broad band frequency receiver SC' (not shown) is associated to the narrow band frequency receivers of the originating register RE1.

In the originating register circuit RE1 the inputs *k*'2, *k*'1 of the hybrid network HN1 are connected to ground and negative battery E via the identical resistances R11 and R12 respectively, these resistances being included in the resistance network RN1. In the terminating register circuit RE2 the inputs *k*1, *k*2 of the hybrid network HN2 are connected to negative battery E and ground via the resistances R21 and R22 respectively, which are identical to the above resistances R11, R12 and which are included in the resistance network RN2. In this manner, a DC current flows from the originating register circuit RE1 to the terminating register circuit RE2 and vice-versa through the resistances R11, R21 and R22, R12 and via the wires *a* and *b* respectively, as soon as a connection is established between these register circuits.

The level detector LD comprises the input capacitor C1, the one plate of which is connected to the output of the buffer amplifier BA, and the other plate of which is connected to the base of an NPN type transistor T1. The collector of this transistor T1, which constitutes the output terminal of the level detector LD, is connected on the one hand to the input of the smoothing filter FK and on the other hand to ground through the resistance R10. The emitter of the transistor T1 is connected, on the one hand to ground through the Zener diode ZN and on the other hand to the negative DC potential E through the series connection of the resistances R4, R3, R2, R1. The junction point of the Zener diode Z*n* and resistor R4 and the emitter of transistor T1 is labelled A. The junction points B and C of the resistances R3, R4 and of the resistances R2, R3 are connected to the base of the transistor T1 through the diode W1 and the resistance R8 respectively. The values of the elements are for instance so chosen that the potentials of the emitter of T1 and of the points B, C, D have the values 0.465E; 0.42E; 0.45E; 0.6E with respect to the negative potential E (48 volts), respectively. Hence the potential of the base of the transistor T1 is more negative than the potential of the emitter fixed by the Zener diode ZN, so that the transistor T1 is normally not conductive. The diode W1 is normally conductive and fixes the potential of the base at a value of about 0.435E. The minimum voltage required at the base of the transistor T1 for bringing this transistor in its conductive condition is:

$$E_{\mathrm{bmin}}=E_{\mathrm{W1}}+E_{\mathrm{EM}}+(E_{\mathrm{OB}}-E_{\mathrm{OA}})+I_3(R_3+R_4)$$

where:

$E_{W1}$ is the potential drop through the diode *w*1;

$E_{EM}$ is the difference of potential emitter-base of the transistor T1 in the conductive condition;

$E_{OB}$, $E_{OA}$ are the potentials at the points B and A respectively, when the transistor T1 is not conductive;

$I_3$: is the collector-emitter current when the transistor $T_1$ is conductive.

From this equation it follows that the only terms depending on the temperature variations are EW1 and EEM. However the sum of their values is very small with respect to the sum of the of the values of the other terms and the potential of the base is therefore practically independent from temperature variations.

The inputs *g*1, *g*2, of the interruption detector circuit G2 which is similar to G1 are connected through the resistances R6, R5 to the base of an NPN type transistor T2 and to the anode of a diode W3, respectively. The collector of the transistor T2 is on the one hand grounded through the resistance R7 and on the other hand connected to the anode of a diode W2, the cathodes of the diodes W2 and W3 being joined together. The base of the transistor T2 is also grounded through the resistance R9 and its emitter is connected on the one hand to its base through a protecting diode W4 and on the other hand to the junction point D of the resistances R1, R2 of the level detector LD. The interconnected cathodes of the diodes W2, W3, which constitute the output *g*3 of the line interruption detector circuit G2, are connected to the base of the transistor T1 of the level detector LD.

The transistor T2 is normally conductive, while the protective diode W4 is blocked. Indeed, the emitter of this transistor T2 is connected to the point D, which is at a potential equal to 0.6E while the base of this transistor T2 is connected, on the one hand through the bias resistance R9 to ground and on the other hand through the resistance R6 to the conductor *g*1 which is at a potential of 0.5E, so that the base is at a more positive potential than the emitter. Due to the transistor T2 being in the conductive condition, the potential of its collector as well as the potential of the anode of the diode W2 are substantially equal to 0.6E. The anode of the other diode W3 is connected through the resistance R5 to the conductor *g*2 which is at a potential of 0.5E and the cathodes of the diodes W3, W2 are connected to the base of the transistor T1 of the level detector LD, this base being normally at a potential of about 0.435E due to the transistor T1 being normally not conductive. Hence, for the normal condition of the line the diodes W2, W3 are blocked and the line interruption detector G2 is not operated.

The filter circuit FK, comprises the two series connected resistances R13, R14, the junction point of which is connected to ground through the capacitor C2. The free end of the resistance R13 is connected to the collector of the above transistor T1.

The DC amplifier DCA comprises an PNP type transistor T3, the emitter of which is grounded through the resistance R15. The collector of this transistor T3 constitutes the output of the stage DCA and is connected to the negative DC potential E1 via the winding of the relay S*ur*. The base of the transistor T3 is connected to the free end of the resistance R14. Due to the transistor T1 being normally blocked, the transistor T3 is also normally blocked and the relay S*ur* is not operated.

Figure 8:
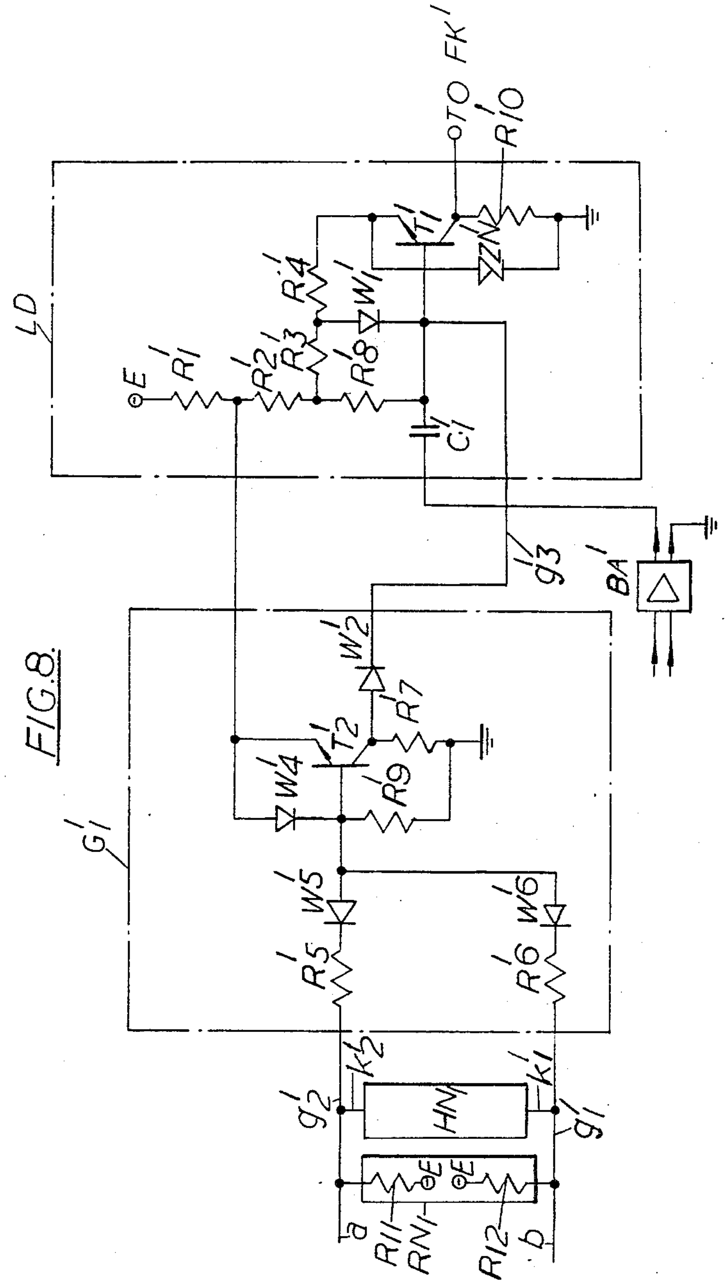
FIG. 8 represents in detail a part of the circuits, according to a second embodiment, shown in FIGS. 1 and 3 and which are included in the originating register circuit.
Figure 9:
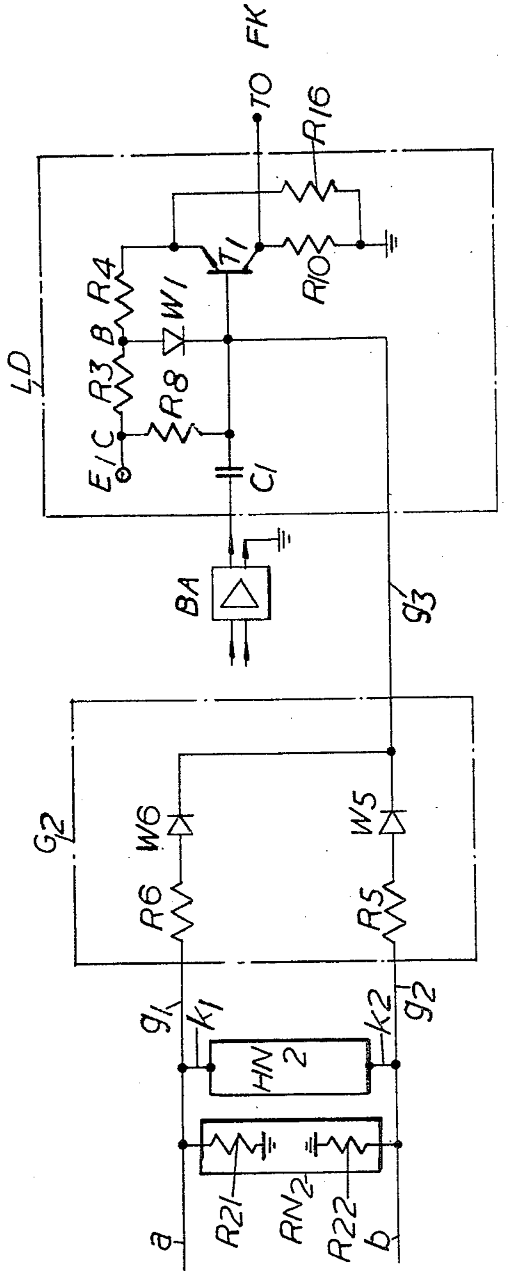
FIG. 9 shows in detail a part of the circuits, according to the second embodiment, represented in FIGS. 1 and 3 and which are included in the terminating register circuit.

FIGS. 8 and 9 show part of the circuits, according to another embodiment, included in the originating register circuit RE1 and in the terminating register circuit RE2, respectively. These circuits can be used, instead of using the circuits according to FIG. 7, in the originating and in the terminating register circuits RE1 and RE2, respectively. The inputs *k'*2, *k'*1 of the hybrid network HN1 (FIG. 8) are connected to the negative DC potential E via the resistances R11 and R12, respectively, whereas the inputs *k*1, *k*2 of the hybrid network HN2 (FIG. 9) are connected to ground via the resistance R21 and R22, respectively. In this manner when a connection has been established between the originating and terminating register circuits RE1 and RE2, a DC current flows between these register circuits over the wire *a* as well as over the wire *b* in the same sense.

Referring to FIG. 8, the inputs *g'*1, *g'*2 of the line interruption detector circuit G1 are connected through the resistances R'6, R'5 to the cathodes of the diodes W'6, W'5 respectively. The anodes of these diodes W'6, W'5 are connected together to the base of the NPN transistor T'2. The level detector LD' and the connections emitter-base, emitter-negative potential E, collector ground and base-ground of this transistor T'2 are the same as those of FIG. 7. The collector electrode of the transistor T'2 is connected to the anode of the diode W'2 the cathode of which constitutes the output *g'*3 of this line interruption detector G1. For the normal condition of the line the diodes W'2, W'5 and W'6 are blocked and the transistors T'2 is not conductive.

Referring to FIG. 9 the inputs *g*1, *g*2 of the line interruption detector circuit G2 are connected through the resistances R6, R5 to the anodes of the diodes W6, W5 respectively. The cathodes of these diodes W6, W5 are interconnected, this junction point constituting the output *g*3 of this line interruption detector circuit G2. The level detector circuit LD is similar to the one shown in FIGS. 7, 8 except that the Zener diode ZN is replaced by the resistance R16 and that the resistances R1, R2 are eliminated, the negative potential E being replaced by the negative potential E1 having a value equal to 0.45E. The value of the resistance R16 is very high with respect to that of the resistances R3 and R4 and such that the emitter potential of the transistor T1 is again equal to 0.415E. For the normal condition of the line the diodes W5 and W6 are blocked.

The operation of the multiple-frequency signalling system is described hereinafter. Hereby it is assumed that the signalling operation is performed according to the compelled method and that the multiple frequency-code used is the 2-out-of-5 code. This method of operation is fully described in the article "Interregister multi-frequency-code signalling for telephone switching in Europe" by M. den Hertog, published in the vol. 38, No. 1, 1963 of the "Electrical Communication."

When the line, e.g. the wire *a* thereof, is interrupted a series of voltage peaks is generated due to the line having a self-inductance and these voltage peaks are propagated to the two register circuits RE1 and RE2. When no DC current circulates on the wires of the line connection these voltage peaks have a smaller amplitude and a shorter duration than when such a DC current circulates, as in the present case. Due to the interruption of a frequency-code signal transmitted from the originating register RE1 the operated narrow band frequency receivers (FIG. 4) of the terminating register circuit RE2 release, each of these receivers being tuned to a distinct frequency of the used multiple-frequency code and the part of voltage peaks which corresponds to one such distinct frequency being insufficient to operate the corresponding receiver. These voltage peaks are however capable to operate the broad band frequency receivers SC, SC' of the terminating and originating registers and to energize the relays S*ur*, S'*ur* associated thereto, respectively. Indeed, each such a broad band frequency receiver is not selective and therefore the part of the voltage peaks situated within the frequency band of the filter network F2 which has a frequency band comprising the frequencies to which the narrow band frequency receivers V1 to V5 are tuned and applied to this filter network via the hybrid network HN2 (FIG. 2) passes through this filter network F2 and is applied to the receiver SC in order to operate the relay S*ur*. This is performed through the amplifier DA, the limiter LI, the buffer amplifier BA, the level detector LD, the filter circuit FK and the amplifier DCA (FIG. 3). In the level detector circuit LD the transistor T1 is rendered conductive due to which the transistor T3 is also made conductive and the relay S*ur* is energized.

In a similar way the relay S'*ur* of the broad band frequency receiver SC' which is included in the originating register RE1 will be operated.

When the interruption of the line connection has a long duration the voltage peaks are damped out after a certain time interval and if no precautions were taken the already energized relays S*ur*, S'*ur* would release. The relays S*ur*, S'*ur* are however maintained energized as will now be explained.

Due to the interruption of the wire *a* the DC current which circulates on this wire *a* is interrupted and the plate of the capacitor CL2 which is connected to this wire through the winding L1 is brought from the potential 0.5E to the potential E. Hence the capacitor $CL_2$ is charged, the potential difference between its plates being equal to 0.5E. But the charge of the capacitor CL2 requires a predetermined time interval corresponding to the time constant of the circuit through which it is charged and therefore the conductors *k*1, *g*1 which are initially at the potential 0.5E will exponentially tend to the potential E and will reach it after the above time interval.

Referring to FIG. 7, after a certain part of this time interval has elapsed, the potential of the base of the transistor T2 is more negative than that of its emitter so that the transistor T2 is blocked. Due to this the anode of the diode W2 is brought at ground potential and since its cathode is at a negative potential this diode W2 is rendered conductive. The transistor T1 is maintained conductive, since its base is at a positive potential with respect to its emitter potential. The transistor T3 also remains conductive and hence the relay S*ur* remains energized. This relay only releases at the normal end of the frequency code signal.

When an interruption occurs on the wire *b* of the line the relay S*ur* is operated by the series of voltage peaks in the same manner as described above with respect to wire *a*. Concerning the line interruption detector G2, it is then the diode W3 which becomes conductive since its anode is brought at ground potential due to the interruption of the wire *b* of the line. Hence, the transistor T1 is again maintained conductive.

In the originating register circuit RE1 the same operations are performed as those just described with respect to the terminating register circuit RE2.

Principally referring to FIG. 8, when an interruption occurs on the wire *a* or *b* of the line or on both the wires *a* and *b* the transistor T'2 will be blocked. Indeed, its base potential, is brought at the value E through the diode(s) W'6 or (and) W'5 which is (are) then conductive. The diodes W'4 and W'2 are also in the conductive condition and the diode W'2 maintains the base potential of the transistor T'1 positive with respect to its emitter potential. Hence this transistor T'1 is also maintained conductive so that also the transistor T'3 remains conductive and hence the relay S'*ur* remains energized.

Principally referring to FIG. 9, when an interruption of the wire *a* or (and) *b* occurs the corresponding diode(s) W6 or (and) W5 is (are) unblocked. The transistor T2 is blocked due to which the base potential of the transistor T1 of the level detector LD is maintained positive with respect to its emitter potential. Due to this the transistor T1 is maintained conductive so that the transistor T3 remains conductive and hence the relay S*ur* remains energized.

Referring to FIG. 6 there are shown the switching circuits of the terminating register circuit RE2. The role played by the above described broad band frequency receiver SC, which operates the relay S*ur* will be better understood in the following example of operation of these switching circuits.

Before the start of a signalling operation the make contacts GGC1, GGC2, GGC3 of the general ground are closed in the terminating register circuit RE2. Due to the closure of the make contact GGC1 the relay A*r* of the counting chain is operated in the following circuit: battery, first winding of relay A*r*, change-over contact *b*2, . . . , change-over contact *d*2, closed make contact GGC1, ground. The thus operated relay A*r* closes its make contact *a*1 and changes the position of its change-over contacts *a*2 to *a*8.

The first signal transmitted by the sending circuit EC1 of the originating register circuit RE1 arrives in the terminating register circuit RE2. The used code being the 2-out-of-5, this signal is a combination of two particular frequencies among the five frequencies used in the code. Two receivers of the receiving circuit RC2 included in the terminating register circuit RE2 will therefore respond to this first signal e.g. the receivers V1 and V2. Also the non-selective receiver SC of the receiving circuit RC2 will be operated. Hence the relays S*ur* (FIG. 3), M*ar* and M*br* (FIG. 4) will be energized and their make contacts *su*, *ma*1, and *mb*1 will be closed. Due to the closure of the make contacts *ma*1, *ma*2 the relays N*ar*, N*br* (FIG. 6) are operated in the following circuits: battery, first winding of relay N*ar* (N*br*), closed make contact *ma*1 (*mb*1), change-over contact *k*2, break contact *y*2, ground. The make contacts *na*1, *na*2 and *nb*1, *nb*2 are closed. The relays N*ar* and N*br* also modify the position of their contacts included in the well known code checking circuit CC such that the checking relay K*r* is operated in the following circuit when the received code is correct: battery, closed make contact *su*, first winding of relay K*r*, code checking circuit CC, break contact *y*1, ground.

The thus operated relay K*r* closes its make contacts *k*1, *k*3, *k*4 and changes the position of its change-over contact *k*2.

The relay K*r* is blocked as follows: battery, closed make contact *su*, second winding of relay K*r*, closed make contact *k*1, ground. The release of this holding circuit is hence controlled only by the release of the relay S*ur* opening then its closed make contact *su*.

The relay B*r* is energized in the following circuit: battery, first winding of relay B*r*, closed make contact of the change-over contact *a*2, closed make contact *a*1, closed make contact *k*1, ground.

The relays A*ar* and A*br* of the registering chain are energized in the following circuit: battery, winding of relay A*ar* (A*br*), closed make contact of the change-over contact *a*4 (*a*5), closed make contact *na*2 (*nb*2), closed make contact *k*3, ground.

The firs code is thus registered, the relays A*ar*, A*br* being blocked in the following circuits: battery, winding of relay A*ar* (A*br*) closed make contact *aa*(*ab*), closed make contact GGC3, ground.

SN (FIG. 6) is for instance a rotary switch which is stepped to a next position each time a forward signal is received and registered. In each of its positions the rotary switch SN establishes a connection between the make contact *k*4 and two out of the five relays Z*ar*, to Z*er* each controlling a backward frequency transmitter (not shown). When the first forward signal has been received and registered the rotary switch SN establishes for instance a connection between the make contact *k*4 and the relays Z*ar* and Z*br*. These relays Z*ar* and Z*br* are energized in the following circuit: battery, winding of relay Z*ar* (Z*br*), rotary switch SW, closed make contacts *k*4 and *k*1, ground.

The displacement of the change-over contact *k*2 causes the opening of the circuit through which the relays N*ar* and N*br* have been energized. Simultaneously it establishes the following holding circuit for these relays: battery, second winding of the relay N*ar* (N*br*), closed make $na_1$ ($nb_1$), closed make contact of the change-over contact *k*2, closed break contact *y*2, ground.

The energized relay B*r* of the counting chain, closes its make contacts *b*1 and *b*4 to *b*8, as well as the make contacts of its change-over contact *b*2 and *b*3. Due to the closure of the contact *b*2 the relay Y*r* is energized in the following circuit: battery, winding of relay Y*r*, closed make contact of the change-over contact *a*3, closed make contact of the change-over contact *b*2, . . . , break contact of the change-over contact *d*2, closed make contact GGC1, ground.

The thus energized relay Y*r* opens its break contacts $y_1$ and $y_2$ and due to this the relays N*ar* and N*br* are released and the operating circuit of the relay K*r* is opened.

From the above it follows that the switching circuits SW2 of the register circuit RE2 are independent from the relays M*ar* to M*er* of the narrow band frequency receivers V1 to V5. They are only dependent on the relay S*ur* associated to the broad band frequency SC included in this register circuit RE2. Indeed, as follows from the above, the end of the frequency code signal is detected by the releasing relay S*ur* which then opens its make contact *su*, thus releasing the relay K*r*. As long as the relay S*ur* is energized its make contact *su* remains closed and the relay K*r* is held energized by means of its holding circuit mentioned hereabove. Due to this, the relay A*r* of the counting chain is held energized (battery, second winding of relay A*r*, closed make contact *a*1, closed make contact *k*1, ground). Consequently the relay Y*r* is also maintained and operated in the circuit mentioned above. The relays N*ar* to N*er* cannot be energized, the break contact of the change-over contact *k*2 and the break contact *y*2 being opened. Any change of the condition of the registering chain is impossible due to the relay A*r* being maintained energized. Furthermore the emission of the backward signal is continued, the make contacts *k*4 and *k*1 of the relay K*r* being closed.

Figure 5:
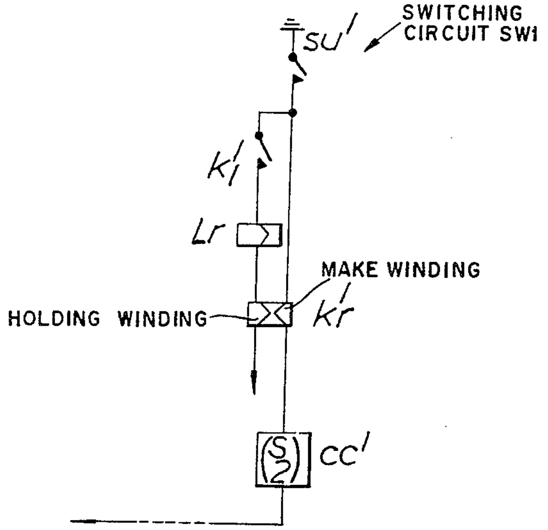
FIG. 5 shows part of the switching circuits included in the originating register circuit.

Referring finally to FIG. 5, the checking relay K'*r* once energized, upon the receipt of a correct backward signal, is blocked in this condition in the following holding circuit: battery, second winding of relay K'*r*, winding of relay L*r*, closed make contact *k*'1, closed make contact *s*'*u*, ground. The same operations as those described when referring to FIG. 6 are performed and the same effects are obtained.

It is to be noted that in the above description the register circuit RE1 has been considered only as an originating one, capable of transmitting forward signals and receiving backward ones, while the register circuit RE2 has been considered only as a terminating one, capable of receiving forward signals and transmitting backward ones. In practice a register circuit may perform both the functions of the originating and terminating register. Therefore it is obvious that it then includes the suitable circuits enabling these operations.

While the principles of the invention have been described above in connection with specific apparatus, it is to be clearly understood that this description is made only by way of example and not as a limitation on the scope of the invention.

I claim:

1. A multi-frequency signalling system including multiple-frequency generator means associated with multiple-frequency receiver means over a transmission path, said receiver means including a plurality of narrow band frequency receivers, each adapted to react to a predetermined frequency, broad band frequency receiver means associated with said plurality of narrow band frequency receivers and adapted to react to the signalling frequencies of the associated narrow band frequency receivers, said receiver means including code-verifying bistate means normally in a first condition, means for switching said bistate means to a second condition responsive to the simultaneous occurrence of one out of a number of predetermined combinations of said narrow band frequency receivers being operated and said broad band frequency receiver means being operated, means for maintaining said bistate means in said second condition under the sole control of the associated broad band frequency receiver, and a line interruption detector circuit associated with said broad band frequency receiver, said line interruption detector circuit operating the associated broad band frequency receiver when the transmission path is interrupted.

2. Multiple-frequency signalling system as claimed in claim 1, characterized in this, that the first and second ends of said transmission path are branched between the first pair of terminals of a first and a second coupling network, e.g. a hybrid transformer, respectively; each coupling network having a first, a second and a third pair of terminals, that the second pair of terminals of each coupling network is coupled to said multiple-frequency generator means, whereas the third pair of terminals of each coupling network is coupled to said multiple-frequency receiver means, the multiple-frequency generator means coupled to said first coupling network being associated with the multiple-frequency receiver means coupled to said second coupling network and vice-versa, that said multiple-frequency receiver means include at least one group of said narrow band frequency receivers and an associated broad band frequency receiver, which are coupled to said third pair of terminals via a band-pass filter the frequency band of which comprises the frequencies to which the narrow band frequency receivers of said group react.

3. Multiple-frequency signalling system as claimed in claim 2, characterized in this, that said broad band frequency receiver is constituted by the series connection of a voltage amplification circuit, a level detector circuit, a smoothing filter circuit and a DC current amplifier circuit the output of which is connected to an input of another bistate device.

4. Multiple-frequency signalling system as claimed in claim 1, characterized in this, that in each coupling network the terminals constituting said first pair are interconnected through two identical series transformer windings separated by a decoupling capacitor and are connected first to the one end of a first and a second resistance respectively, the other ends of these first and second resistances being connected to fixed DC potentials, and second to the first and second inputs of said line interruption detector circuit the output of which is coupled to a part of said level detector circuit.

5. Multiple-frequency signalling system as claimed in claim 4, characterized in this, that the other ends of the first and second resistances associated to said first coupling network are connected to a first fixed DC potential, whereas the other ends of the first and second resistances associated to said second coupling network are connected to a second fixed DC potential, that said first and second inputs of a first line interruption detector circuit which is connected to said first coupling network are coupled through a first and a second diode respectively to a control electrode of an amplifying device an output electrode of which is connected to one end of a first unilateral resistance, the other end of which constitutes the output of said first line interruption detector circuit which includes said amplifying device, said first and second diodes and said first unilateral resistance, and that said first and second inputs of a second said line interruption detector circuit, which is connected to said second coupling network are coupled to one end of a second and a third unilateral resistance respectively, the other ends of which are joined together and constitute the output of said second line interruption detector circuit, which includes said second and said third unilateral resistances.

6. Multiple-frequency signalling system as claimed in claim 4, characterized in this, that the other ends of the first and second resistances associated to said first coupling network, are connected to a first and a second fixed DC potential respectively, whereas the other ends of the first and second resistances associated to said second coupling network are connected to a third fixed and to a fourth fixed DC potential respectively, said first and said second fixed DC potentials being identical to said fourth and said third fixed DC potentials respectively, that said first and second inputs of a first line interruption detector circuit which is connected to said first coupling network, are connected to one end of a first unilateral resistance and coupled to a control electrode of an amplifying device respectively, an output electrode of said amplifying device being connected to one end of a second unilateral resistance and that the other ends of said first and said second unilateral resistances are joined together and constitute the output of said first line interruption detector circuit which includes said amplifying device and said first and second unilateral resistances.

7. Multiple-frequency signalling system as claimed in claim 6, characterized in this, that said first and second inputs of a second said line interruption detector circuit which is connected to said second coupling network, are coupled to a control electrode of another amplifying device and to one end of another first unilateral resistance respectively, an output electrode of said other amplifying device being connected to one end of another second unilateral resistance and that the other ends of said other first and other second unilateral resistances are joined together and constitute the output of said second line interruption detector circuit which includes said other amplifying device and said other first and other second unilateral resistances.

8. Multiple-frequency signalling system as claimed in claim 7 characterized in this, that said amplifying device of each said line interruption detector circuit has at least a first, a second and a third electrode, that said first electrode constitutes said control electrode and is connected through a bias resistance to a fixed fifth DC potential, that said second electrode is connected on the one hand to said control electrode through a third diode and on the other hand to a sixth fixed DC potential through a third resistance and that said third electrode is an output electrode and is connected to said fifth fixed DC potential via a fourth resistance.

9. Multiple-frequency signalling system and level detector circuit as claimed in claim 8, characterized in this, that the output of each said line interruption detector circuit is connected to said first electrode of said amplifying device comprised in said level detector circuit, which is included in the circuit of the associated broad band frequency receiver.

References Cited

UNITED STATES PATENTS

| | | | |
|---|---|---|---|
| 2,293,203 | 8/1942 | Gosmann | 179—16.09 |
| 2,314,229 | 3/1943 | Lundstrom | 179—16.09 |
| 3,128,349 | 4/1964 | Boesch et al | 179—84 |
| 3,140,357 | 7/1964 | Dischof et al. | 179—84 |
| 3,229,041 | 1/1966 | Drake et al. | 179—84 |

KATHLEEN H. CLAFFY, *Primary Examiner.*

H. ZELLER, R. LINN, *Assistant Examiners.*